United States Patent
Accetta et al.

(10) Patent No.: US 8,050,193 B2
(45) Date of Patent: Nov. 1, 2011

(54) METHOD FOR DETERMINING PROSPECTIVE PEERING PARTNERS FOR AN INTERNET SERVICE PROVIDER

(75) Inventors: Daniele Accetta, Turin (IT); Giuseppe Larosa, Castellamonte (IT)

(73) Assignee: Telecom Italia S.p.A., Milan (IT)

( * ) Notice: Subject to any disclaimer, the term of this patent is extended or adjusted under 35 U.S.C. 154(b) by 182 days.

(21) Appl. No.: 12/226,740

(22) PCT Filed: Apr. 28, 2006

(86) PCT No.: PCT/EP2006/004005
§ 371 (c)(1),
(2), (4) Date: Jan. 23, 2009

(87) PCT Pub. No.: WO2007/124771
PCT Pub. Date: Nov. 8, 2007

(65) Prior Publication Data
US 2009/0190583 A1    Jul. 30, 2009

(51) Int. Cl.
*H04L 12/28* (2006.01)
*H04L 12/66* (2006.01)
*G06F 15/173* (2006.01)

(52) U.S. Cl. ........ 370/254; 370/352; 370/389; 370/401; 709/224

(58) Field of Classification Search .......... 370/238–352, 370/389–401; 709/203–214, 220–239
See application file for complete search history.

(56) References Cited

U.S. PATENT DOCUMENTS

| | | | |
|---|---|---|---|
| 6,009,081 A * | 12/1999 | Wheeler et al. | 370/255 |
| 6,377,987 B1 * | 4/2002 | Kracht | 709/220 |
| 6,385,649 B1 * | 5/2002 | Draves et al. | 709/224 |
| 6,539,455 B1 * | 3/2003 | Khanna et al. | 711/108 |
| 6,567,380 B1 | 5/2003 | Chen | |
| 6,651,096 B1 * | 11/2003 | Gai et al. | 709/223 |
| 6,850,528 B1 * | 2/2005 | Crocker et al. | 370/401 |
| 7,313,133 B2 * | 12/2007 | Yarlagadda | 370/352 |
| 7,430,176 B2 * | 9/2008 | Nalawade et al. | 370/238 |

(Continued)

FOREIGN PATENT DOCUMENTS

WO    WO 2004/021650 A1    3/2004

OTHER PUBLICATIONS

Rekhter, Y. et al., "A Border Gateway Protocol 4 (BGP-4)," Network Working Group, Request for Comments: 1771, Obsoletes: 1654, Category: Standards Track, pp. 1-57, (Mar. 1995).

(Continued)

*Primary Examiner* — Man Phan
(74) *Attorney, Agent, or Firm* — Finnegan, Henderson, Farabow, Garrett & Dunner, L.L.P.

(57) ABSTRACT

A method for determining prospective peering partners for an internet service provider, includes gathering internet service provider's routing and traffic information; gathering additional routing information from sources other than the internet service provider; identifying uncovered target autonomous systems based on the internet service provider's routing and traffic information, the uncovered target autonomous systems being autonomous systems with non-null traffic and that are reachable by the internet service provider via a transit relationship; identifying paths from the internet service provider to the uncovered target autonomous systems based on the additional routing information; identifying intermediate autonomous systems along the identified paths; and determining at least a prospective peering partner for the internet service provider based on the identified intermediate autonomous systems.

17 Claims, 5 Drawing Sheets

U.S. PATENT DOCUMENTS

| | | | |
|---|---|---|---|
| 7,554,930 B2* | 6/2009 | Gaddis et al. | 370/254 |
| 2003/0120769 A1* | 6/2003 | McCollom et al. | 709/224 |
| 2003/0225873 A1 | 12/2003 | Wade | |
| 2005/0010653 A1* | 1/2005 | McCanne | 709/219 |
| 2006/0072478 A1 | 4/2006 | Fleischman | |
| 2007/0011743 A1* | 1/2007 | Krishnamurthy | 726/23 |
| 2007/0061397 A1* | 3/2007 | Gregorat et al. | 709/203 |
| 2009/0323544 A1* | 12/2009 | Gaddis et al. | 370/252 |

OTHER PUBLICATIONS

"Tier 1 Network," http://en.wikipedia.org/wiki/Tier_1_network, pp. 1-6, (Dec. 2008).

"List of Tier 1 IPv4 ISPs," http://en.wikipedia.org/wiki/Tier_1_network, pp. 1-2, (Nov. 2008).

"Tier 2 network," http://en.wikipedia.org/wiki/Tier_2_network, 1 sheet, (Oct. 2008).

Norton, W. B., "The Art of Peering—The peering Palybook," The Art of Peering—The peering Palybook v1.1, http://www.xchangepoint.net/info/wp20020625.pdf, pp. 1-16, (2002).

"Peering," http://en.wikipedia.org/wiki/peering, pp. 1-8, (Dec. 2008).

sFlow, "Making the Network Visible," http://www.sflow.org/index.php, 1 sheet, (2008).

Meyer, D., "University of Oregon Route Views Archive Project," http://archive.routeviews.org, pp. 1-2, (2004).

* cited by examiner

METHOD FOR DETERMINING PROSPECTIVE PEERING PARTNERS FOR AN INTERNET SERVICE PROVIDER

CROSS REFERENCE TO RELATED APPLICATION

This application is a national phase application based on PCT/EP2006/004005, filed Apr. 28, 2006.

TECHNICAL FIELD OF THE INVENTION

The present invention relates in general to Internet Service Provider connectivity, and more particularly to scouting prospective peering relationships to improve internet connectivity of an Internet Service Provider.

BACKGROUND ART

As it is known, optimization of connectivity to the Internet of an Internet Service Provider (ISP) is strongly related to the nature and topology of the Internet as a whole. In fact, the Internet is a combination of interconnected component networks that share the same addressing structure, a common routing vision and a name-assignment system. At present, this combination contains more than 20,000 networks or administrative domains, commonly referred to as Autonomous Systems (ASes), and this number continues to increase. An AS identifies a network managed by a single ISP, and hence these two terms are generally regarded as synonyms.

In this context, no ISP can operate in complete isolation from the others, for obvious limitations in the geographic extension of its own networks, the points of presence, and overall capacities of the Internet backbones. On the other hand, every customer of an Internet Connectivity Service provided by a given ISP expects complete and total accessibility to all destinations present on the Internet.

In order to guarantee an adequate service to its customers, each ISP, also in view of the growing competition on prices, performance and reliability, must constantly update and improve its own interconnections to the Internet, establishing and developing suitable relationships with other ISPs. These relationships can be equal relationships (bilateral or multilateral), commonly referred to as peering relationships, or customer/provider relationships, commonly referred to as transit relationships, thus giving rise to various interconnection typologies between ISPs characterized by different commercial and technical properties.

A peering relationship can be further classified according to the number of ISPs that interconnect to each other, and in particular into the following two classes: bilateral or private peering and multilateral or public peering. Bilateral or private peering represents a technical/commercial relationship between two ISPs that reciprocally guarantee connectivity to all of their customers. This relationship constitutes the execution of an equal agreement between two ISPs that exchange traffic between their networks, normally without any form of economic payment. An agreement of this type is only feasible if both of the ISPs receive the same level of benefit. Instead, in the case of multilateral or public relationships between ISPs, peering is achieved at public interchange points, commonly referred to as Internet Exchange Points (IXP), which allow the interconnection of the ASes involved via a shared level-2 device (L2 switch) or via a route-server that distributes traffic routing information to the involved ASes.

FIG. 1 shows an example of a peering relationship: AS1, AS2, and AS3, each provided with a respective routing table RT1, RT2, and RT3, reciprocally exchange routing information related to their own clients (identified by circles), consequently allowing the transit of traffic in the opposite direction. AS2 does not propagate to AS1 routing information regarding the customers of AS3 and vice versa, in this way preventing the transit of traffic from AS1 to AS3 over its own network.

In the case of customer/provider relationships, there is a transit service to the Internet, that consists in a technical/commercial relationship in which an ISP, commonly referred to as Upstream Provider, provides access to all of the destinations contained in its own routing tables to another ISP, commonly referred to as Customer ISP or AS, with an associated payment flow from the Customer ISP to the Upstream Provider. An ISP can assume the role of customer for one or more Upstream Providers, and this case is commonly referred to as Multi-homing.

FIG. 2 shows an example of a transit relationship: AS1 and AS3 are customers of AS2 and use the network or backbone infrastructure of the latter to exchange traffic between their customers.

The routing over different domains on the Internet (also referred as inter-domain routing) is performed through a protocol commonly known as Border Gateway Protocol (BGP). For a general discussion of the characteristics and the application of the BGP protocol reference can be made to "A Border Gateway Protocol 4(BGP-4)" by Y. Rekhter and T. Li, RFC 1771, T. J. Watson Research Center, Cisco, March 1995.

BGP represents the universally used protocol to allow the accessibility between different ISPs through the exchange of all information needed to route the traffic between the ASes building the Internet. The BGP protocol allows each AS to adopt its own policy in selecting the paths and propagating the reachability information towards the other networks. The routing information is contained in special routing tables, commonly known as BGP tables, which represent ISPs' intra-domain routing information and are built from the BGP messages exchanged between the ISPs at the interconnection points.

With the big and fast expansion of the Internet, in modern telecommunications networks the issues related to peering and, more in general, to the interconnection between different domains have become increasingly important, especially for ISPs that have Internet access services as an element of their core business. Furthermore, the context is highly dynamic: in fact, if on the one hand the ISPs that make up the core of the Internet network are well known and relatively stable (the so-called top-level or Tier 1 ISPs, such as those defined by http://en.wikipedia.org/wiki/Tier_1_carrier#List_of_Tier_1_ISPs, in alphabetic order: AOL Transit Data Network, AT&T, Global Crossing (GX), Level 3, MCI, Nippon Telegraph and Telephone (Verio), Qwest, SAVVIS, and Sprint Nextel Corporation), on the other hand a whole series of second and third level ISPs (defined as Tier 2 or Tier 3) exists that, although characterized by less extensive and capillary networks than those of Tier 1, are nevertheless extremely numerous and offer new opportunities of interconnection and business relationships.

The consequence of this is that while in the past each ISP sought to extend and improve its own interconnection to the Internet by establishing the greatest possible number of peering relationships with subjects of equal standing, in today's ISPs (above all for those classified as Tier 2), awareness and need exist to build and maintain a base that is solid, but limited in the number of peering partners, partnered by just a few, highly reliable Upstream Providers.

The technical and commercial value of interconnections between ISPs is also highlighted by the fact that ad hoc workgroups or departments have been set up within ISPs' organizational structures to deal solely with peering management (technical aspects of networks, provisioning and marketing). Often, the activities of these groups, and in particular the choice of optimal interconnections to improve Internet connectivity, are only guided and supported by heuristic methods based on simple operating measurements or the experience and relational contacts of individuals. For a discussion regarding peering strategies reference may be made to The Art of Peering: The Peering Playbook, at http://www.xchangepoint.net/info/wp20020625.pdf.

OBJECT AND SUMMARY OF THE INVENTION

The Applicant has noticed that in the context of the ISPs, there are a whole range of references in literature on the subject of peering networks (for a brief view, reference may be made to http://en.wikipedia.org/wiki/Peering). However, in Applicant's present knowledge, plausibly because this topic is heavily correlated to the interests of the individual ISPs, no systematic approach founded on a shared, technical basis for tackling the problems connected with peering management seems to have been yet proposed, as well as automatic tools aimed at supporting the ISPs in peering management, and in particular that automatically and directly implement a procedure to search, process and evaluate new peering relationships between a reference Provider and other operators.

It is within this context, certainly complex due to the dynamics and dimensions involved, that the present invention originates, the objective of which is to provide a methodology to support scouting for new peering relationships in a systematic manner, in order to improve the Internet connectivity of an ISP.

In particular, the objective of the present invention is to provide a solution that in general allows an ISP to increase the Quality of Service (QoS) offered to its customers, while reducing operating costs for the management and maintenance of peering relationships and the bandwidth requested from the Upstream Providers, with a consequent decrease in an important cost item for an ISP.

More in particular, the objective of the present invention is to provide a solution that allows one or more of the following goals to be achieved:

improvement in the global level of connectivity of an ISP, meant as the best level of interconnection to the Internet and a reduction in the number of ASes traversed to reach the most important destinations, with a consequent improvement in network performance;

engineering of the ISP's network, via the activation and maintenance of peering relationships considered "first-rate", namely those essential for maximizing the ISP connectivity;

greater control over the growth of network infrastructures and their simplification, as the equipments and ports for interconnection with other ISPs can be maintained or deployed according to the effective connectivity needs with the outside; and more precise control of bandwidth requirements and consumption.

This objective is achieved by the present invention in that it relates to a method, a system, and software product for determining new potential peering partners for an ISP (with the aim of improving internet connectivity thereof), as defined in the appended claims.

The present invention achieves the aforementioned objective by making use of the ISPs' intra-domain routing and traffic information, namely BGP routing information and traffic data collected at clearly defined points of the ISPs' networks, and extra-domain routing information available at public observation points commonly known as Looking Glasses, Public Route Servers, and Internet Registry. A procedure composed of several phases is then applied to this input data, which provides a list of ISPs with which the establishment of peering relationships emerges as convenient and feasible from the technical/commercial viewpoint, in order to improve interconnections with the Internet and reduce the traffic quotas that normally transit, against economic compensation, via the networks of the Upstream Providers.

Briefly, the Applicant has found that, by identifying Target ASes reachable by a reference ISP only through Upstream Provider(s) based on ISP's BGP information and traffic data, then identifying the ASes that are intermediate between the reference ISP and the identified Target Autonomous Systems based on public information (like public BGP tables), and finally opportunely ranking these intermediate ASes, it is possible to select the ASes that are most suitable for peering with the Reference ISP in order to improve internet connectivity thereof.

The present invention provides therefore a very fast and efficient way to determine new peering partners for a reference ISP, i.e. new ASes (or, more appropriately, new ISPs) with whom the reference ISP can advantageously establish new peering relationships.

The method of the present invention is suitable to be implemented as an algorithm and run on a common PC.

BRIEF DESCRIPTION OF THE DRAWINGS

For a better understanding of the present invention, preferred embodiments, which are intended purely by way of example and are not to be construed as limiting, will now be described with reference to the attached drawings, wherein:

FIG. 6 shows a block diagram of an example of possible routes to reach a Target AS;

DETAILED DESCRIPTION OF PREFERRED EMBODIMENTS OF THE INVENTION

The following discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein and defined in the attached claims.

The present invention is implemented by means of a software application that, when loaded in a memory of and run on a processing system, scouts new BGP peering relationships and provide the ISP with useful information for optimizing its own connectivity to the Internet by establishment of new peering relationships.

Figure 1:
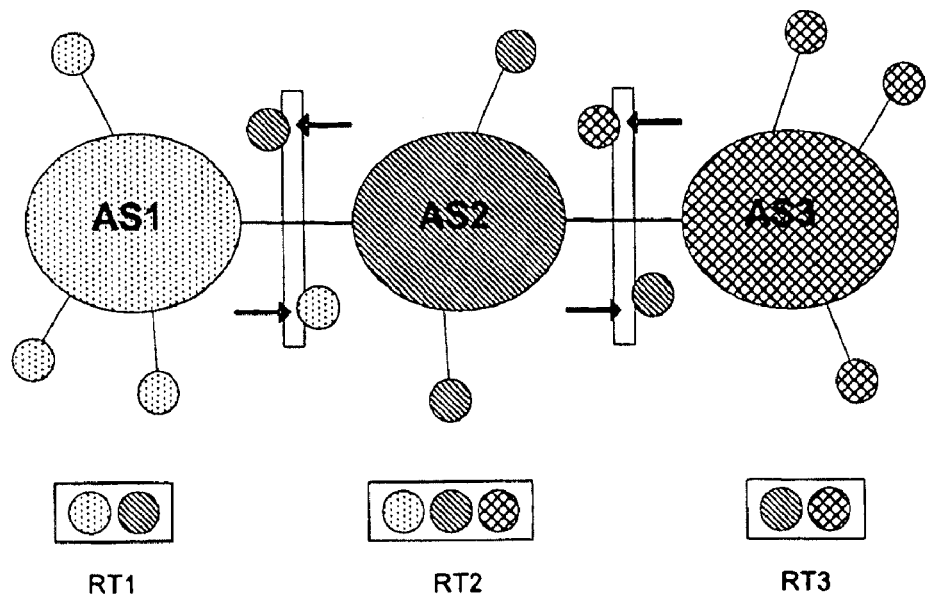
FIG. 1 shows a block diagram of an example of a peering relationship.
Figure 2:
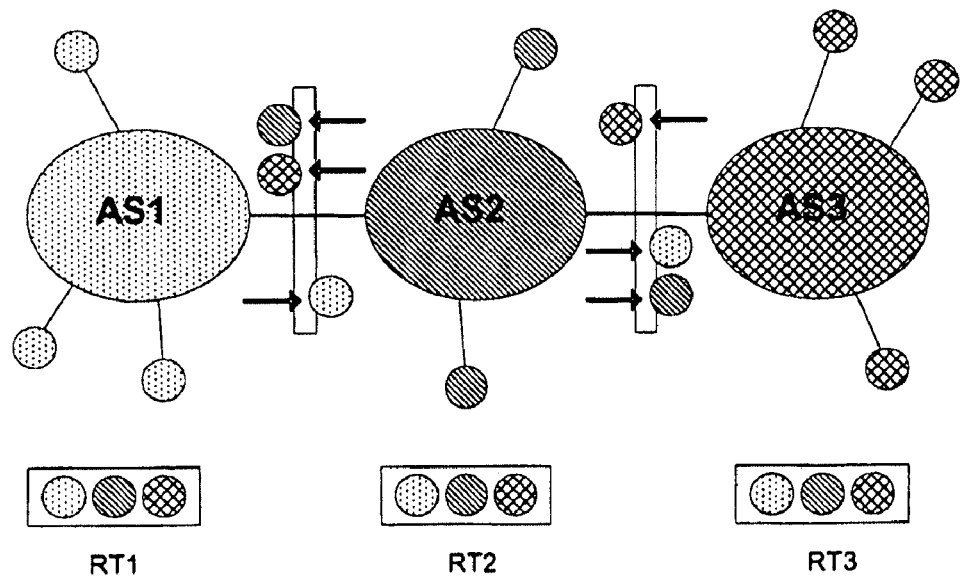
FIG. 2 shows a block diagram of an example of a transit relationship.
Figure 3:
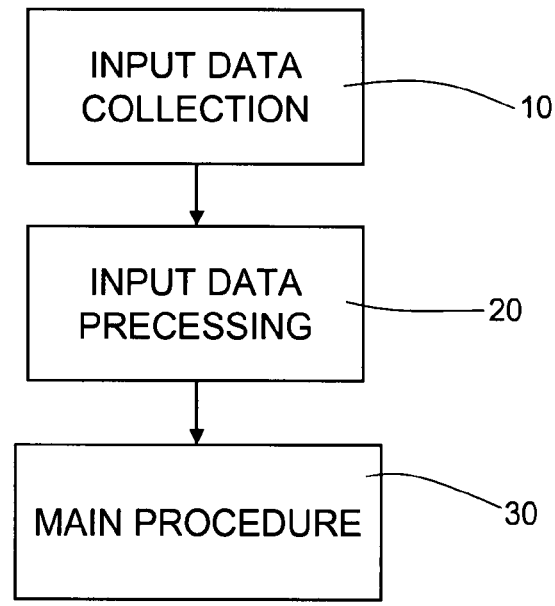
FIG. 3 shows a basic flowchart of a input data collection procedure of the present invention.

FIG. 3 shows a flowchart of the steps of the procedure implemented by such software application. In particular, the proposed procedure basically includes three steps:

1. Input data collection (block 10);
2. Input data pre-processing (block 20); and
3. Main procedure and output generation (block 30).

As far as step 1) is concerned, input data collection includes the collection of data necessary for the execution of the main procedure. Collected input data may be classified according to the following three typologies:

1.1. Input Data for Execution Control

It includes basic information, keyed in by a user of the software application, possibly via a specific Graphical User Interface (GUI), which allows the processing execution mode to be controlled. An essential data item to be keyed in is the period of observation T, namely the time interval (days, weeks, etc.) for which it is intended to carry out the evaluation: an up-to-date view of the ISP's network and the Internet as a whole is provided by choosing periods of observation close to the moment of starting the analysis.

1.2. Input Data Related to the ISP that Wants to Evaluate Potential Candidates for New Peering Relationships This data includes:

1.2.1. The complete list of relationships in force, both transit and peering, active during the period of observation T, necessarily with indications of the AS Names and the AS Numbers (ASNs). In fact, each AS, corresponding to a given ISP, is identified in an unequivocal manner by a number with values ranging from 1 to 64511, which is used by the BGP routing protocol, and which is assigned, upon request, by organizations known as Internet Routing Registries (IRR) that manage the world-wide use of the ASNs. ASNs are public and available on the IRR Internet sites or on Websites such as that of CIDR (http://www.cidr-report.org/), which constantly monitors allocation of AS Numbers and provides other statistics on the global BGP table, announcements on the Internet, etc. By way of example, the first lines of the list of associations between ASNs and the corresponding names, extracted from the mentioned site, are shown below:

| | |
|---|---|
| AS0 | Reserved |
| AS1 | LVLT-1 - Level 3 Communications, Inc. |
| AS2 | LOGIN-TTI - Login, Inc. |
| AS3 | MIT-GATEWAYS - Massachusetts Institute of Technology |
| AS4 | ISI-AS - University of Southern California |
| AS5 | SYMBOLICS - Symbolics, Inc. |
| ... | |

AS-related data can be classified into the following three groups:

AS_UPSTREAM group, composed of the AS Numbers and Names of the Upstream Providers of the Reference ISP;

AS_PEER group, composed of the AS Numbers and Names of the ISPs with which peering relationships are active for the Reference ISP; and AS_CUSTOMER group, composed of the AS Numbers and Names of the ISPs which are customers of the ISP considered.

1.2.2. The volumes of traffic handled by the Reference ISP during the period of observation T, aggregated according to a method described hereinafter and classified according to the interface typologies present on the border routers of the ISP's network (to Customer ISPs, Peering ISPs or Upstream Providers). Regarding the utilization of traffic volumes handled by the Reference ISP, all methodologies of traffic collection and accounting known in literature are considered valid, both those that use passive probes and those that exploit the functionality of the network's border routers (amongst known software tools for traffic accounting, it is possible to consider, for example, the software product known under the trade name of NetFlow® provided by Cisco Systems on its own routers, the software product cflowd developed by CAIDA—http://www.caida.org/tools/measurement/cflowd/, and the software product developed by sFlow—http://www.s-flow.org/index.php), provided that they allow data to be supplied according to an aggregation scheme that contains at least the following fields: destination ASN (or Target AS), source ASN, and traffic volumes (expressed in bytes, for example). To be utilized, this data must be further aggregated in order to associate with each destination ASN an overall volume of traffic in bytes that is destined to it in the forward direction to the Internet (Forward Traffic Volume, that is from reference ISP to Target AS), and an overall volume of traffic originated by the ASN in the return direction from the Internet to the Reference ISP (Backward Traffic Volume in the reverse direction), for example, using the procedure described in WO2004/021650. The group of destination ASNs, which identify the Internet destinations for which the ISP effectively provides accessibility, is defined as AS_TARGET.

1.2.3. BGP tables, one for each border router, of the Reference ISP relative to the period of observation T, collected at the interconnection points of the ISP's network with the external networks. As is known, BGP tables essentially form a database in which three parts may be logically distinguished:

a first part, commonly known as Adj-RIBs-In, contains information collected from incoming updating messages; the content of this part represents all of the available routing paths as input for the decisional process of the BGP process, excluding the routes associated to advertisements that have already been blocked in input to the router (for example by means of prefix list or access list filters);

a second part, commonly known as Loc-RIB, contains local routing information selected by applying local policies to the routing information contained in the database part Adj-RIBs-In, a third part, commonly known as Adj-RIBs-Out, in which selected information is stored in view of the advertisement function to subjects considered as "peers", with which communication takes place via the BGP protocol.

The routing information which is stored in such a database is organized in a set of information elements, as listed below, namely:

IP destination network, and a string, commonly referred to as AS-path, describing the autonomous systems to be traversed in order to reach such an IP destination network.

For the purposes of routing data completeness, all routes received by the router via the BGP protocol should be collected. This information must therefore be extracted from the BGP protocol database (which contains a reachability table with all routes known to the router via the BGP protocol) and not from the routing table (RIB, Routing Information Base), which only contains the best routes according to BGP metrics and the routing policies applied by the ISP. By way of example, the BGP database can normally be obtained on Cisco routers via the "show ip bgp" command and allows all routes known to the router via the BGP protocol to be displayed, not just the best ones. These routes are the only ones received if a BGP session is set up with the border router.

Figure 4:
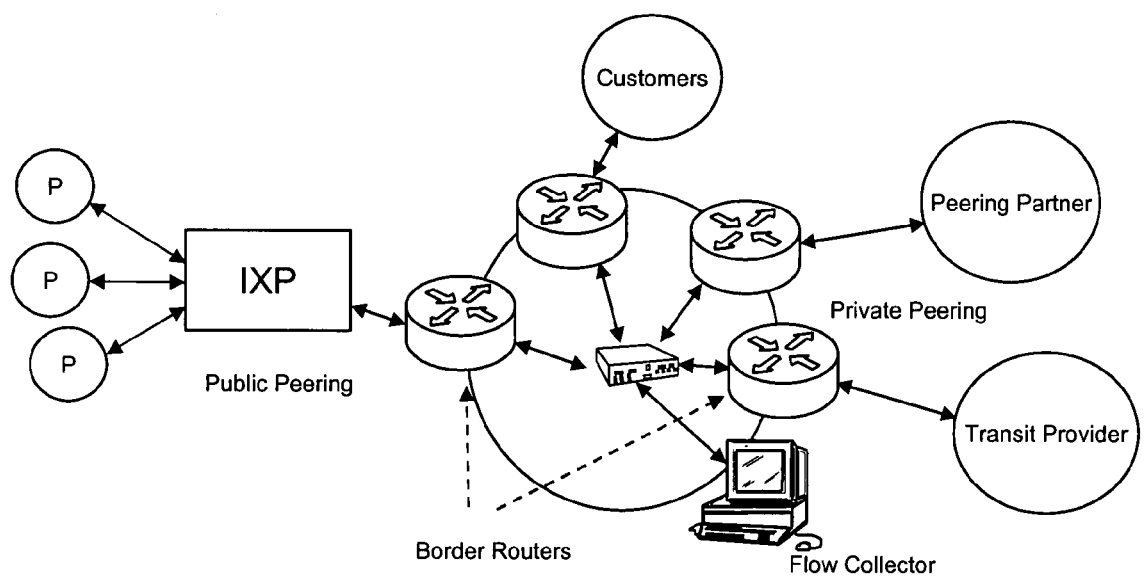
FIG. 4 shows a block diagram of a network of an ISP and points (border routers) at where ISP traffic information is collected.

FIG. 4 shows the reference points of an ISP's network (above-mentioned border routers of the network) where the above-described information is collected, possibly aggregated or preprocessed by the ISP's processing system (e.g., Flow Collectors, data collection workstations, or network inventory systems).

1.3. Input Data from Publicly Available Data Sources in the Internet

This data allows the completion and enhancement of the input data for executing the main procedure, introducing extra-domain routing data of a "neutral" nature, in that this data is shared within the Internet community and provides "viewpoints" which are not directly linked to the Reference ISP and are different from those provided by the ISP's BGP tables (intra-domain routing data) as described in previous point 1.2.3.

In particular, this data includes:

1.3.1 Public BGP tables collected by public Looking Glass or Route Servers (such as Oregon View, RIPE RIS, etc.) related to the period of observation T; these tables contain routing data concerning the accessibility of Internet destinations from the collection point considered. In order to obtain the broadest level of completeness, the same collection criterion as that described in previous point 1.2.3. is applicable in this case as well. At present, the most comprehensive public BGP tables are Oregon View's ones (http://archive.routeviews.org/) and RIPE RIS project's ones; and 1.3.2 Up-to-date comprehensive information regarding the associations between ASNs and the corresponding ISPs' names, as well as a list of the ASNs of the Tier-1-rated ISPs (the aforementioned AOL Transit Data Network, AT&T, Global Crossing (GX), Level 3, MCI, Nippon Telegraph and Telephone (Verio), Qwest, SAWIS, Sprint Nextel Corporation): this is public data, easily obtainable from the same Internet Routing Registries (RIPE, ARIN, APNIC, LACNIC, AFRNIC) or from Web sites like CIDR (http://www.cidr-report.org/).

As far as step 2) of FIG. 3 is concerned, input data preprocessing includes a number of operations, which are hereinafter described in execution order with reference to FIG. 5, which graphically summarizes all of the preprocessing operations, highlighting both the operations and the databases involved:

2.1. Preprocessing of the ISP's BGP Tables and Detection, for each Peering, of "Uncovered" Target ASes.

Figure 6:
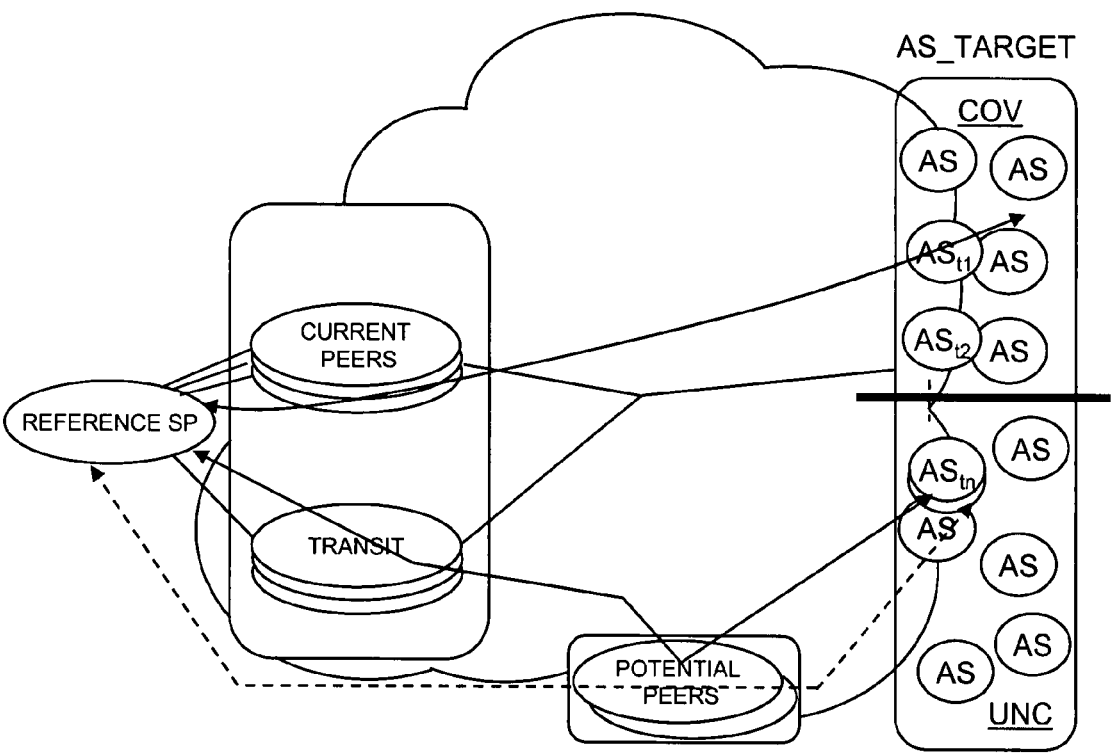

FIG. 6 shows an abstract representation of the possible routes to reach Target ASes grouped in a AS_TARGET box, starting from the reference ISP, and a classification of Target ASes served by peering partners (Current Peers), hereinafter referred to as AS_COVERED group (COV), and those which are reachable by the Reference ISP via Upstream Providers (Transit), hereinafter referred to as AS_UNCOVERED group (UNC). Also shown in FIG. 6 is a group of intermediate ASes (Potential Peers), which can be identified by the method of the present invention and which could be used by the reference ISP to reach the Target ASes of the AS_UNCOVERED group in place of the Upstream Providers.

In view of what is shown in FIG. 6, the aim of this step of the procedure is to find the group of Target ASes characterized by non-null traffic volumes and which are only reachable via Upstream Providers.

This information can be obtained by applying an appropriate method for determining the Target ASes from the ISP's traffic data (see previous step 1.2.2) and the ISP's BGP tables (see previous step 1.2.3). Similarly with what is described in WO2004/021650 filed in the name of the present Applicant, the information of interest in the BGP tables consists of the AS_PATH record associated with BGP routes, in particular to the BGP routes characterized by non-null traffic volumes and reachable only via Upstream Providers; this record identifies the sequence of ASes (identified by their ASNs) traversed to reach the indicated IP prefix (i.e. the Target AS). All of the other information contained in the tables is not used in the method explained herein and can therefore be removed. This first step therefore includes extracting from the BGP tables the list of all the AS_PATH attributes.

By way of example, part of a BGP table obtainable from an IP router is shown below (each line corresponds to a BGP route, i.e. a different path to the IP prefix):

| [IP prefix] | [next-hop] | [metrics] | [AS_PATH] |
|---|---|---|---|
| * 4.0.0.0 | 128.177.255.5 | 0 | 3557 6453 1 |
| * | 192.121.154.25 | 0 | 1755 1 |
| * | 203.181.248.233 | 0 | 7660 1 |
| * | 157.22.9.7 | 0 | 715 1239 1 |
| * | 195.66.224.42 | 0 | 5409 12885 6847 1 |
| * | 205.158.2.126 | 0 | 2828 1 |
| * | 216.140.2.63 | 0 | 6395 1 |

Extraction of the AS_PATH attributes allows the following list L_AS_PATH of all the AS_PATH attributes to be obtained:

| AS-path(i) -> | 3557 6453 1 |
|---|---|
| | 1755 1 |
| | 7660 1 |
| | 715 1239 1 |
| | 5409 12885 6847 1 |
| | 2828 1 |
| | 6395 1 |

A generic path may be written in the form:

AS-path(i): ASN(1) ASN(2) . . . ASN(AS_TARGET)

The last ASN in each line (the one in the right end position of the line and equal to 1 in this example) is the number of the Target AS that originates the IP prefix associated with the route (4.0.0.0), while the first ASN in each line (the one in the left end position of the line) represents, in normal conditions, the AS (which in general may correspond to a Peer, a Customer or an Upstream Provider) from which the Reference ISP has received the route. It should also be noted that, excluding configuration errors or network faults, the routing policies of the ISPs are always defined in such a way that the BGP routes via Peers or Customers are always preferred with respect to those via Upstream Providers (since, as already anticipated, traffic routed via Upstream Providers implies a cost for the ISP).

In the light of this observation, it is possible to provide a procedure for identifying the AS_UNCOVERED group from the ISP's BGP tables and the list of Upstream Providers. The proposed method works with iterative cycles on the previously obtained AS_PATH attributes.

Considering a Target AS, all AS_PATH attributes that contain the corresponding ASN in the last position (right end) are selected. A selected Target AS belongs to the AS_UNCOVERED group if the following criteria are satisfied:

- The Target AS does not belong to the previously identified AS_UPSTREAM, AS_PEER, and AS_CUSTOMER groups (see 1.2.1);
- At least one AS_PATH attribute exists in which ASN(1) belongs to the AS_UPSTREAM group;
- No attribute AS_PATH exists among the selected ones in which ASN(1) belongs to the AS_PEER or AS_CLIENT group.

To complete the AS_UNCOVERED group, the procedure must be repeated for all of the Target ASes in the L_AS_PATH list. Other procedures for determining the AS_UNCOVERED group may be used: for example, in some cases, the AS_UNCOVERED group could be directly identified via accounting or monitoring systems active on the ISP's network.

Figure 5:
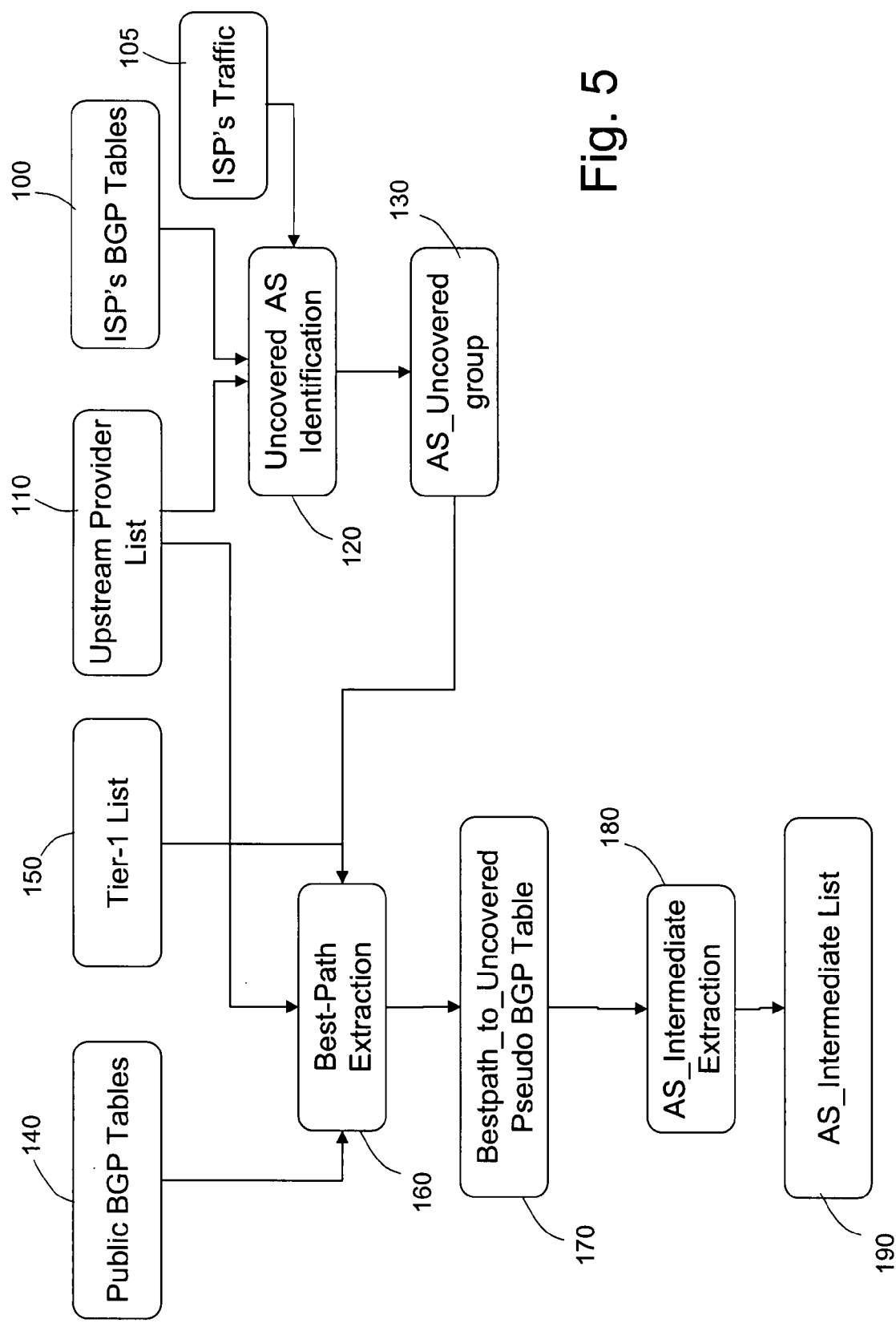
FIG. 5 shows a block diagram of operations and databases of an input data pre-processing procedure of the present invention.

In FIG. 5, identification of the AS_UNCOVERED group is represented by blocks 100-130, where block 100 represents the ISP's BGP tables, block 105 represents the ISP's traffic data, block 110 represents the list of Upstream Providers, block 120 represents the identification procedure, and block 130 represents the AS_UNCOVERED group so identified.

2.2 Extraction of Potential Best Paths to the ASes in the AS_UNCOVERED Group

Given a number of BGP paths contained in the BGP tables, the best path to a given Target AS is the path characterized by a shorter AS_PATH in terms of number of hops. The objective of this step therefore consists in constructing a modified BGP table that contains all and only the paths (i.e. AS_PATH) identified as potential best paths to the ASes in the AS_UNCOVERED group. The basic idea is to obtain, for each Target AS in the AS_UNCOVERED group, all of the best paths that potentially reach it, based on the information contained in the group of public BGP tables collected as previously described in 1.3.1. By analogy with that described in 2.1, it is necessary to form a list containing the union of all useful AS_PATH attributes, this list defining a pseudo BGP table, hereinafter referred to as BESTPATH_TO_UNCOVERED, that represents a subgroup of the paths in the public BGP tables that, for the upstream Internet direction (from the public observation point to the final Internet destinations), contain AS_PATH attributes with the following properties:

- the last ASN in the path (right end of the string represents one of the Target ASes included in the AS_UNCOVERED group (the final destination ASes) (input from 2.1);
- the first ASN in the path (left end of the string) is a particular kind of ISPs selected between the Upstream Providers (Transits) of the Reference ISP and the Tier-1 ISPs (that the Reference ISP would like to by-pass) (input from 1.3.2);
- a minimum length in terms of number of ASNs forming the AS_PATH among the evaluated paths having the features of the previous two points and ending on a same Target AS; and
- uniqueness characteristic, in other words no two identical AS_PATHs exist (removal of repetitions).

Ultimately, the BESTPATH_TO_UNCOVERED group or list will be made up of AS_PATH attributes of the type:

AS_PATH(i): ASN(1) ASN(2) . . . ASN(AS_UNCOVERED)

where the ASN to the right belongs to the AS_UNCOVERED group, while ASN(1) belongs to the AS_UPSTREAM group or is the ASN of a Tier-1 ISP.

It is to be observed that relationships among the ASes forming the BESTPATH_TO_UNCOVERED group will typically be of a Transit type.

Moreover, it is to be noted that such group could include two or more paths having the same length and the same ASN (AS_UNCOVERED).

The list obtained in this manner (certainly rich in AS_PATH attributes for the connectivity characteristics of the Tier-1 ISPs and for the use of numerous public BGP tables that offer different viewpoints) is used to build a virtual BGP table that contains the AS_PATH attributes of potential peering partners with AS_UNCOVERED ASes as the final destination.

In FIG. 5, the best-path extraction procedure and construction of the BESTPATH_TO_UNCOVERED pseudo BGP Table is represented by blocks 140-170, where block 140 represents the public BGP tables, block 150 represents the list of Tier-1 ISPs, block 160 represents the best-path extraction procedure, and block 170 represents the BESTPATH_TO_UNCOVERED pseudo BGP Table so constructed.

2.3. Extraction of Intermediate ASes

The intermediate ASes in each AS_PATH are then extracted from the BESTPATH_TO_UNCOVERED pseudo BGP Table, where the intermediate ASes are all ASNs different from ASN(1) and ASN(AS_UNCOVERED). The list of extracted intermediate ASes will hereinafter be referred to as of AS_INTERMEDIATE.

Each of the intermediate ASes found is then associated with the name of the corresponding ISP, via information collected in step 1.3.2, and with information related to the geographic location (identifying the name of the relevant Internet Routing Registry (IRR): RIPE, ARIN, etc.). Therefore the AS_INTERMEDIATE list is extended by adding two new columns:

| [ASN] | [As name] | [IRR] |
|---|---|---|
| 1234 | ISPx | RIPE |
| 5678 | ISPy | ARIN |
| ... | ... | ... |

In FIG. 5, the Intermediate AS extraction procedure is represented by blocks 180 and 190, where block 180 represents the extraction procedure, and block 190 represents the AS_INTERMEDIATE list so formed.

Finally, as far as step 3) of FIG. 3 is concerned, the aim of the main procedure is to determine, among the IPSs having the AS in the AS_INTERMEDIATE list, a group of ISPs with which to establish new peering relationships. The main procedure includes a number of operations, which are hereinafter described in execution order with reference to FIG. 7, which graphically summarizes all of the processing operations, highlighting both the operations and the databases involved:

3.1. Determination of the ISPs Connectivity Index and Topological Importance of each Intermediate AS An objective of this step is to associate each of the ASes identified in 2.3 with a value indicative of the expected benefits for the reference ISP of a peering relationship with the ISP corresponding to such AS, in terms of capacity to increase the accessibility of Target ASes already guaranteed by the relationships currently in force (the AS_PEER group) and to achieve the technical effects considered in the introduction (performance improvements, reduction of bandwidth required to the Upstream Providers, etc.). This value represents therefore a benefit index, herein below called "connectivity index" (or "connectivity value").

Another objective of the present step is to determine the topological importance of the ISP associated with the ASes identified in 2.3. This topological importance amounts to the ISP's weight or value within the global context of the Internet.

Based on these parameters, an "AS Ranking" can be obtained, by using for example the method for estimating Internet connectivity described in the previously identified WO2004/021650 in the name of the present Applicant.

It can nevertheless be appreciated that any other method to draw-up "AS Ranking" known in literature can be applied as well.

The method described in WO2004/021650 requires a list of the ISPs to be evaluated (in the present case made up of the AS_INTERMEDIATE list), a BGP routing table, which in the present case corresponds to the public BGP tables (step 1.3.1) and, lastly, the traffic volumes. This last item however is not pertinent for the purposes of the present AS Ranking computation, where a uniform traffic profile is assumed as it is required to make a "neutral" analysis.

In this way, it is possible to build an "absolute" (topological) AS Ranking, taking into account all of the possible paths that a given AS has to the Internet destinations. Thus, in the "forward" direction, i.e., from the AS of the Reference ISP to the rest of the Internet, a forward connectivity index is obtained for each AS in the AS_INTERMEDIATE list, as well as the AS of the Reference ISP. By defining FCON(k) as an estimated topological forward connectivity index for a generic AS in position k in the AS_INTERMEDIATE list, this list may be extended by adding a new column, as in the following example:

| [ASN] | [AS name] | [IRR] | [FCON] |
|-------|-----------|-------|--------|
| 1234  | ISPx      | RIPE  | 10000  |
| 5678  | ISPy      | ARIN  | 100    |
| ...   | ...       | ...   | ...    |

Figure 7:
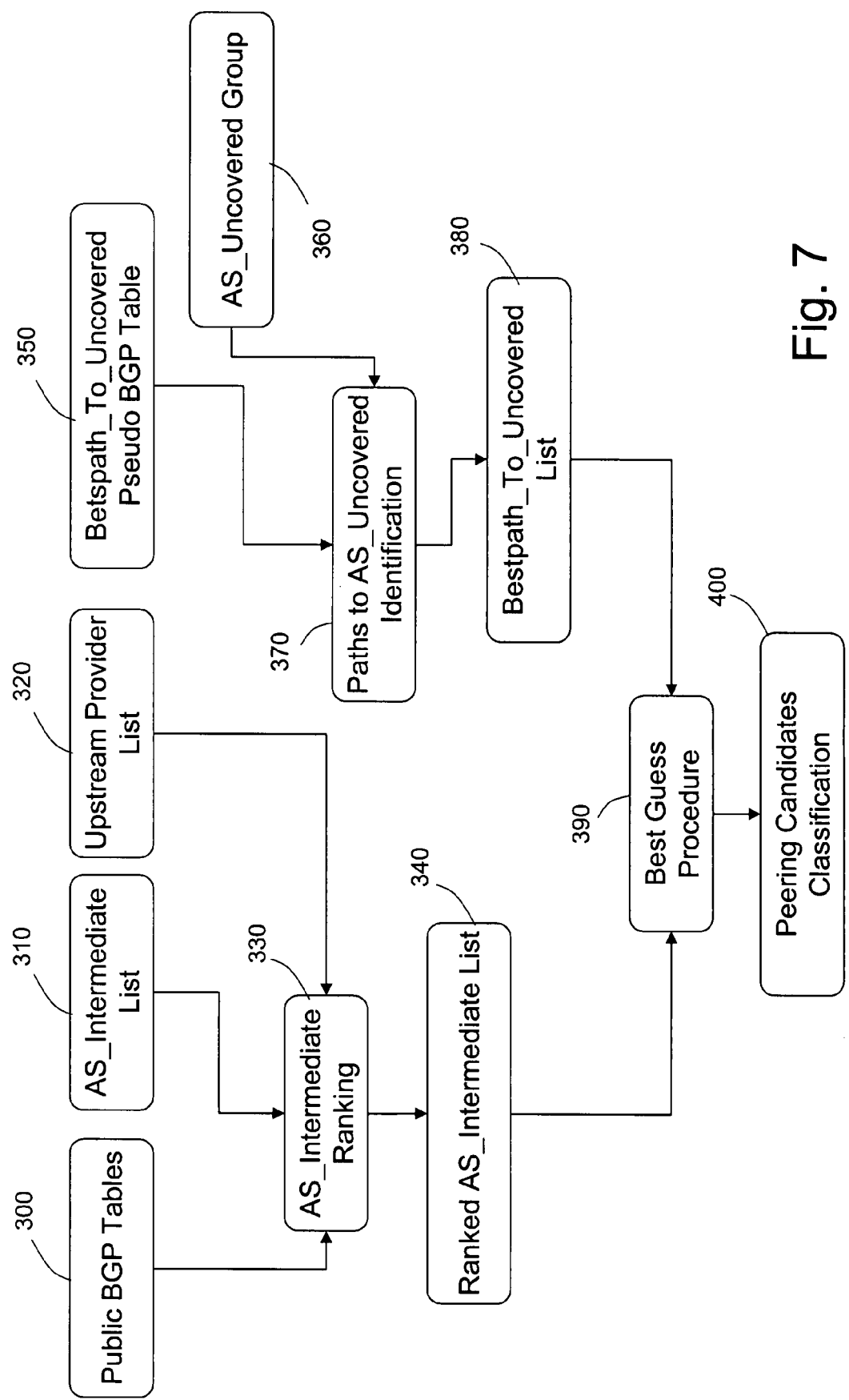
FIG. 7 shows a block diagram of operations and databases of a main procedure and output generation of the present invention.

In FIG. 7, the AS_INTERMEDIATE Ranking procedure is represented by blocks 300-340, where block 300 represents the public BGP tables, block 310 represents the AS_INTERMEDIATE list, block 320 represents the Upstream Provider list, block 330 represents the ranking procedure, and block 340 represents the ranked AS_INTERMEDIATE list so determined.

3.2. Identification of Separate Paths that Reach the Same Target AS

The paths in the BESTPATH_TO_UNCOVERED pseudo BGP table processed in 2.2 are reconsidered one by one. The table is processed to determine, for each Target AS in the AS_UNCOVERED group, the number of separate existing paths having the same Target AS on the right end (but different in at least one intermediate AS or the initial AS). This information, hereinafter referred to as BESTPATH_TO_UNCOVERED list, is opportunely stored and is used in the next step.

In FIG. 7, this identification procedure is represented by blocks 350-380, where block 350 represents the BESTPATH_TO_UNCOVERED pseudo BGP table, block 360 represents the AS_UNCOVERED group, block 370 represents the identification procedure, and block 380 represents the BESTPATH_TO_UNCOVERED list so identified.

3.3. "Best Guess" Procedure

Each of the paths belonging to the BESTPATH_TO_UNCOVERED list obtained in step 3.2 is examined, trying to make an estimate, hereinafter referred to as "Best Guess". In particular, the aim of this step is to work out which AS in the AS_INTERMEDIATE list is the best connectivity provider (i.e., the AS with best FCON connectivity index) for each AS belonging to AS_UNCOVERED group, taking into account the following restriction:

the higher the Internet connectivity value of the AS concerned, the more efficient and/or convenient would be a peering relationship with the IPS associated with such an AS;

the IPS associated with the AS concerned must be "paritary" with respect to the Reference ISP, i.e. the connectivity value associated therewith must not be too much dissimilar from that of the Reference ISP, otherwise a peering relationship would be unlikely.

The AS Ranking determined in 3.1 can provide a direct measure of the effectiveness of an AS and estimate the "strength ratios" between the ISPs in the AS_INTERMEDIATE group and the Reference ISP from a technical viewpoint. In fact, it should be remembered that as a rule, a peering relationship is feasible between ASes classifiable as equal, according to both commercial and technical criteria, such as the size and capillarity of their network infrastructures (factors partially estimated via the FCON index). Having a measurement of the strength ratios allows better discrimination between entries in the AS_INTERMEDIATE list, which might include subjects not available for peering because they are too big or too small. In fact, if the Reference ISP was a Tier-2 ISP, the AS_INTERMEDIATE list might include Tier-1 ISP, normally not receptive to peering with lower-level ISPS; on the other hand, there might be ISPs in the AS_INTERMEDIATE list with a strength ratio strongly oriented towards the Reference ISP: these ISPs could represent new customers, more than potential peering partners.

Figure 8:
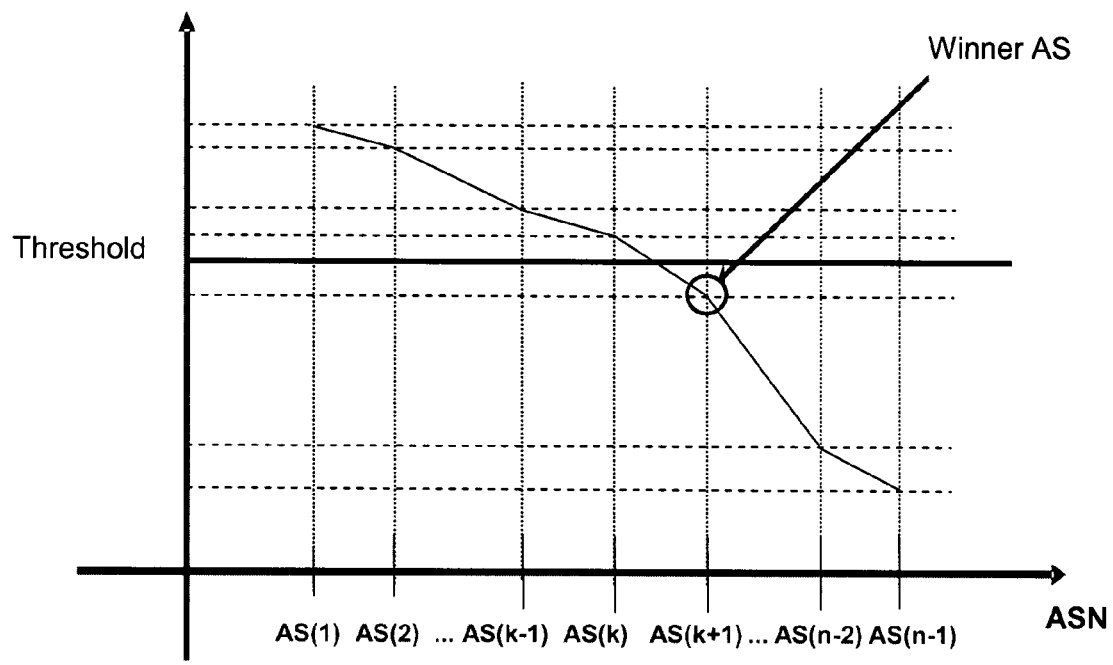
FIG. 8 shows a chart relating to intermediate AS identification and best path classification.

With reference to FIG. 7, the "Best Guess" procedure takes each separate path in the BESTPATH_TO_UNCOVERED list into consideration and assigns a forward connectivity value FCON(k) (determined in 3.1) to each intermediate AS(k) in the AS_PATH. It is to be noted that the value of FCON will typically be increasing when moving from the Target AS to the Upstream Provider (i.e. from right to left in FIG. 8), due to the fact that the relationship among ASes is of a Transit type.

A threshold criteria is subsequently applied, which is defined as follows: for each AS_PATH considered, the ASNs are considered from right to left, starting from the last but one AS in the path (so excluding the AS_target), and comparing each time the value FCON(k) (expressed in dB for example) of the current AS(k) with a threshold given by the sum of the FCON of the Reference ISP (expressed in dB) and an opportunely chosen offset_dB value.

If FCON(k) is lower than the threshold the next to left AS in the path (in position k−1) is considered and its FCON(k−1) is compared to the threshold. If, as shown in FIG. 7, FCON(k) is greater than the threshold, the process is stopped, and the previous AS (in position k+1, i.e. on the right with respect to AS(k) in the diagram of FIG. 7), typically having a value FCON(k+1) just below the threshold, is considered as the "winner of the round" among the ASes belonging to the AS_INTERMEDIATE list; in other words, AS(k+1) is considered as the most suitable potential connectivity provider for the given Target AS on the considered AS_path.

If no one of the ASes in the path has a FCON value over the threshold, the search ends when the first position in the AS path is reached. In the former case, the specific AS in position j+1 belonging to the AS_INTERMEDIATE list with FCON (j+1) (typically) just below the threshold is considered as the "winner of the round", in other words the potential connectivity provider for the given Target AS of the considered AS_path.

This procedure is repeated for each separate path belonging to BESTPATH_TO_UNCOVERED list. Accordingly, a set of convenient prospective connectivity providers, in a number equal to the number of separate paths in the BESTPATH_TO_UNCOVERED list, is obtained.

The relation created between uncovered ASes and intermediate ASes (belonging to AS_INTERMEDIATE list) can successively be completed with traffic information, in order to gain additional information for an adequate choice of new peering relationships. In fact, each uncovered AS makes available a traffic quota in bytes (information obtained in step 1.2) that can be divided by the overall number of best paths that terminate in that uncovered AS (number calculated in step 3.2). Given that each separate path has only one winner intermediate AS, this traffic quota is added to the current traffic volume of the intermediate AS, in order to construct a sort of "potential traffic" attribute, namely a so-called Best Guess Volume (BGV), in bytes. In other terms, a merit figure is computed for the ASes belonging to the AS_INTERMEDIATE list in order to draw up a classification based on traffic volumes towards the uncovered ASes potentially served by the ASes of the AS_INTERMEDIATE list.

So, the final output of this step is the production of a list containing the following elements:

| [ASN] | [AS name] | [IRR] | [FCON] | [BGV] |
|-------|-----------|-------|--------|---------|
| 1234  | ISPx      | RIPE  | 10000  | 100000  |
| 5678  | ISPy      | ARIN  | 100    | 2000000 |
| ...   | ...       | ...   | ...    | ...     |

This output can be further processed, for example ranking for decreasing BGV values, or for increasing FCON values, so as to provide a quantitative criterion for the selection of the intermediate ASes most suitable for new peerings.

In FIG. 7, the Best Guess procedure and the peering candidate ranking are represented by blocks 390 and 400.

The "Best Guess" procedure benefits from certain properties that make it of interest from the viewpoint of effective application of the method:

Estimate approximation is always by defect, as the computations are only performed for the Target ASes not currently accessible via peering relationships; once the relationship is established, the traffic quota sent will always be greater than the estimate;

Estimates for different candidates can be summed as any overlaps (two intermediate ASes that serve the same Target AS) have already been counted in the computation;

The final Target ASes are not processed in step 3.1 as this would involve longer computation times and, besides, the classification of all ASNs present on the Internet is of no interest.

This conservative estimate can be completed by carrying out post-processing on the Covered Target ASes; in fact, it should not be ignored that a new peering relationship can subtract traffic volume from already existing peers. This post-processing can be performed by considering, instead of the AS_UNCOVERED group, the group of all Target ASes towards which a non-null traffic volume has been recorded on the network of the Reference ISP, and reapplying the procedure starting from step 2.2. Estimate refinement requires longer computation times and may not be considered necessary if the primary interest of computation is essentially that of subtracting traffic from the Upstream Providers.

After selection of one or more new potential peering partners by the method previously described, physical connectability with them must be ascertained. Typically there are two possibilities: direct interconnection between the respective apparatuses or interconnection via an intermediary physical infrastructure, typically called Internet Exchange Point.

At the end of the procedure, new peering relationships can be set up between the Reference ISP and the "most convenient" intermediate ASes determined by the method previously described, thus improving the connectivity and the performances of the Reference ISP.

Finally, it is clear that numerous modifications and variants can be made to the present invention, all falling within the scope of the invention, as defined in the appended claims.

For example, it is evident to those skilled in the art that the present invention can be applied by using either the strictly defined BGP tables or by table structurally similar or functionally equivalent to the BGP table under question: for this reason in the claims which follow, reference will be generally made to tables of a "BGP type", in order to include within the invention also such similar or equivalent tables, the same considerations being applicable also to the extraction function of the BGP paths, which are to be dealt the sequel.

The invention claimed is:

1. A method for determining prospective peering partners for an internet service provider, comprising:
    gathering internet service provider's routing and traffic information;
    gathering additional routing information from sources other than the internet service provider;
    identifying uncovered target autonomous systems based on the internet service provider's routing and traffic information comprising:
        identifying all target autonomous systems for which the internet service provider provides accessibility,
        for each identified target autonomous system, identifying all paths from the internet service provider to the target autonomous system, and
        defining the target autonomous system as an uncovered target autonomous system if the following criteria are satisfied:
            the target autonomous system is not a peer, a customer or an upstream provider of the internet service provider,
            at least one path exists where the first autonomous system in the path is an upstream provider of the internet service provider, and
            no path exists where the first autonomous system in the path is a peer or a customer of the internet service provider; and
        wherein an uncovered target autonomous system is an autonomous system with non-null traffic from/to the internet service provider and that is reachable by the internet service provider only via a transit relationship; and identifying distinct paths from the internet service provider to the uncovered target autonomous systems among those previously identified based on the additional routing information;
identifying intermediate autonomous systems along the identified paths; and
determining at least a prospective peering partner for the internet service provider based on the identified intermediate autonomous systems.

2. The method of claim 1, wherein the internet service provider's routing and traffic information are internet service provider's intra-domain information, and the additional routing information are extra-domain information.

3. The method of claim 1, wherein the internet service provider's routing information comprises border gateway protocol-like tables, and internet service provider's traffic information comprises traffic volumes handled by the internet service provider.

4. The method of claim 3, wherein the internet service provider's border gateway protocol-like tables are gathered at interconnection points of an internet service provider's network with external networks.

5. The method of claim 1, wherein the additional routing information comprises public border gateway protocol tables collected at public observation points.

6. The method of claim 1, wherein identifying distinct paths from the internet service provider to the uncovered target autonomous systems among those previously identified based on the additional routing information comprises:
identifying distinct paths each satisfying at least the following criteria:
the last autonomous system in the path is an uncovered target autonomous system;
the first autonomous system in the path has an active transit relationship with the internet service provider or is an autonomous system of a high-level-tier internet service provider; and
the path has the shortest length in terms of number of autonomous systems among the paths ending in said uncovered target autonomous system and having a first autonomous system.

7. The method of claim 1, wherein identifying intermediate autonomous systems along the identified paths comprises:
identifying autonomous systems other than the first and the last autonomous systems in the identified paths.

8. The method of claim 1, wherein determining at least a prospective peering partner for the internet service provider based on the identified intermediate autonomous systems comprises:
ranking the intermediate autonomous systems.

9. The method of claim 8, wherein ranking the intermediate autonomous systems comprises:
computing a connectivity value for each intermediate autonomous system, said connectivity value being indicative of the capacity of the internet service provider to increase the accessibility of target autonomous systems through a peering relationship with said intermediate autonomous system;
identifying distinct paths from the internet service provider to the uncovered target autonomous systems among those previously identified based on the additional routing information; and
identifying a specific autonomous system in each identified distinct path from the internet service provider to an uncovered target autonomous system based on the connectivity values of the autonomous systems in the same path.

10. The method of claim 9, wherein identifying a specific autonomous system based on the connectivity values of the autonomous systems in the same path comprises:
starting from the autonomous system preceding the uncovered target autonomous systems and moving toward the first autonomous system in the path, comparing the respective connectivity value of the current autonomous system with a threshold; and
identifying the last autonomous system having a connectivity value lower than the threshold.

11. The method of claim 10, further comprising:
computing said threshold based on the connectivity value of the internet service provider.

12. The method of claim 11, wherein computing said threshold comprises:
adding the connectivity value of the internet service provider and an offset value.

13. The method of claim 8, wherein ranking the intermediate autonomous systems further comprises:
computing a potential traffic volume handled by the identified specific autonomous systems.

14. The method of claim 13, wherein computing potential traffic volumes handled by the identified specific autonomous systems comprises:
determining the traffic volumes to the uncovered target autonomous systems potentially served by the specific autonomous systems.

15. The method of claim 14, wherein determining the traffic volumes to the uncovered target autonomous systems potentially served by the specific autonomous systems comprises:
determining the potential traffic volume handled by each specific autonomous system based on the traffic volume of the specific autonomous system and the traffic volume of the uncovered target autonomous system to which the identified distinct path comprising the specific autonomous systems, leads.

16. A method for improving the connectivity of an internet service provider, comprising determining at least a prospective peering partner for said internet service provider according to the method of claim 1, and establishing an interconnection between an autonomous system associated with said internet service provider and an autonomous system associated with said prospective peering partner.

17. A non-transitory computer readable medium encoded with a computer program product loadable into a memory of at least one computer and comprising software code portions for performing the method according to claim 1.

* * * * *